Patented Mar. 23, 1954

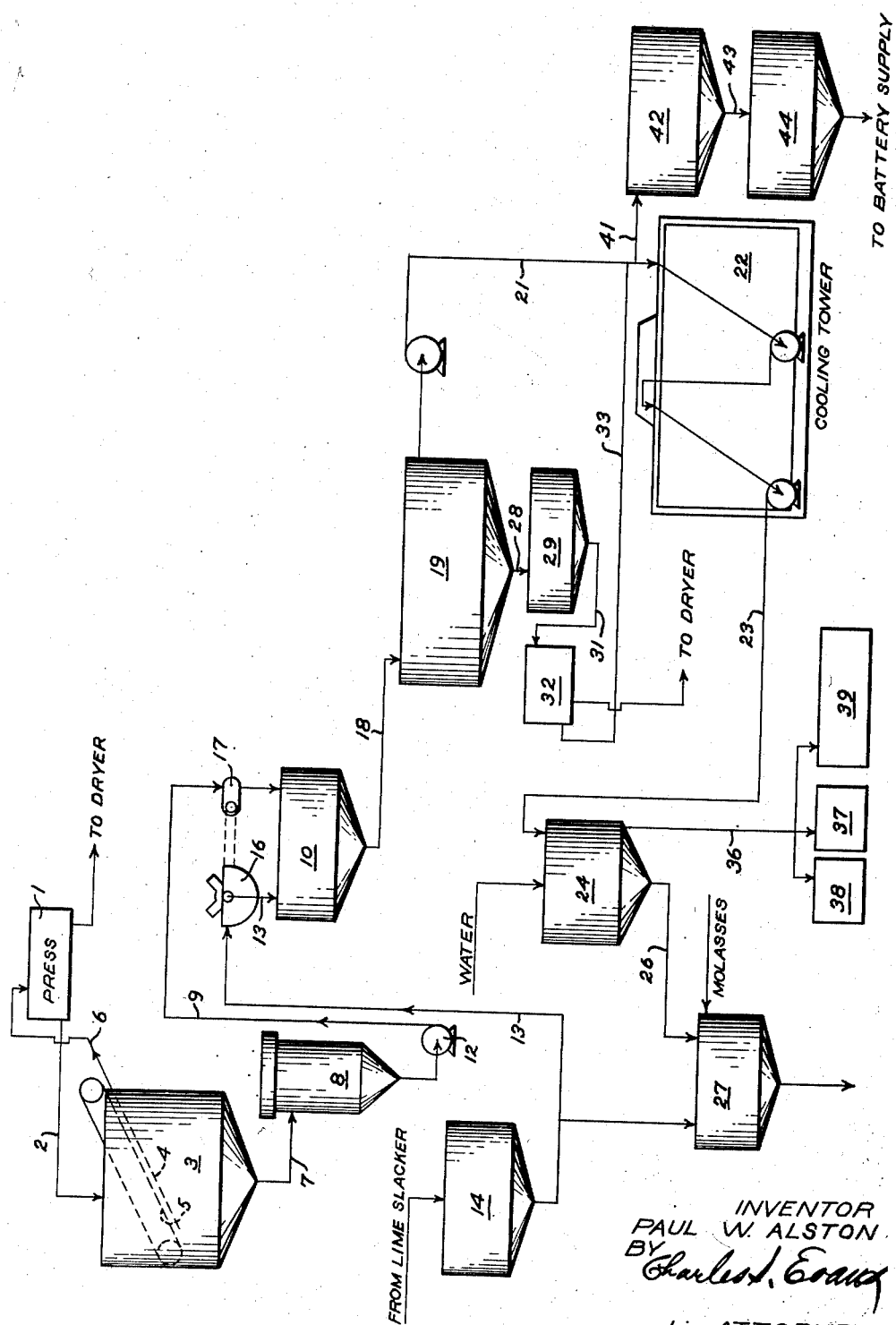

2,673,165

UNITED STATES PATENT OFFICE 2,673,165

PROCESS OF RECLAIMING BEET PULP PRESS WATER

Paul W. Alston, Berkeley, Calif., assignor to Spreckels Sugar Company, San Francisco, Calif., a corporation of California Application November 27, 1950, Serial No. 197,819

3 Claims. (Cl. 127—48)

My invention relates to the reclamation of pulp press water in beet sugar manufacture; and the principal object of the invention is the provision of a method of treating such press water so that it may be used again at various points in the sugar manufacturing process; notably for battery supply, dilution of the molasses in the Steffen process, and for washing the saccharate filters, and also the first carbonation filters.

As important corollaries of the principal object are the avoidance of an expensive installation for sewage disposal of the press water, and sharp reduction in the volume of fresh water required.

Other objects include the recovery of the sugar in the pulp press water in the Steffen process, and the recovery of additional nutrients in the dried beet pulp.

In the processing of sugar beets, the pulp discharged from the diffusion battery contains about 5% solids and 95% water. After passing through the presses, the separated pulp is usually either dehydrated to produce dried beet pulp, or mixed with a small percentage of molasses and siloed.

Although the water, known in the industry as "pulp press water" still contains valuable components including sugar, proteins, and other solids in solution and suspension, it constitutes a serious waste disposal problem. It is not suitable for factory use, except where circumstances permit utilization in a flume to carry the beets from storage to factory. After such use, it is discharged to sewer for final disposal.

Press water production from a thousand tons of beets sliced per day represents the equivalent of a daily sewage load from a population of 25,000 people, and besides the disposal problem represents a wastage of approximately 3000 pounds of sugar, 6000 pounds of pulp solids and 180,000 gallons of water, plus 4,500 pounds B. O. D. My invention is directed to a treatment of the pulp press water, so that it can be used again for various purposes in the sugar making procedure, and so that a valuable recovery of its solids may be effected.

In terms of broad inclusion my process comprises removal of the fine particles of pulp which pass through the presses with the water. Preferably this is done with a fine mesh screen. The water from the screen is collected in a tank to allow release of entrained air, and then is treated with lime in accordance with factors depending on the nature of the beets, extent of extraction and the time and temperature to which the beet cossettes are subjected in the diffusion process. The addition of a proper quantity of lime causes a precipitation which is drawn off and passed through a filter, the filtrate being combined with the clear solution taken off of the settling tank. After cooling this water may be used for dilution water in the saccharate process. Water not used to dilute the molasses may be used to wash the saccharate filters, and the first carbonation filters. If desired, part of the water may be diverted before the cooling step, and after carbonation, passed to battery supply.

In none of these uses of the reclaimed press water, is any deleterious element added in the recovery process. On the contrary, much of the sugar previously lost is recovered, and additional pulp is saved, as well as an enormous gallonage of water.

In describing my invention, reference will be made to the accompanying diagrammatic drawing which constitutes a flow sheet illustrating my process.

Pulp press water from the presses 1 flows from the pipe 2 into the tank 3 and upon the wedge wire screen 4, having preferably 1 mm. openings. The fine pulp is continuously removed by a drag 5, equipped with rubber faced wood flights, and returned by suitable means 6 to the presses. Ultimately the press pulp is conveyed to the dryer for conversion into dried pulp.

The screened water flows preferably by gravity through the conduit 7 to the de-aerating tank 8, where the entrained air escapes. From the tank the water is pumped through the conduit 9 to the mixing tank 10; the pump 12 being such and under such control as to avoid unnecessary agitation and the entraining of air into the discharging water with consequent aggravation of the foaming problem.

Pulp press water is a gray, opaque, extremely foamy liquid, in which the bacteria content is very high and the keeping qualities poor. The suspended solids are largely finely divided pulp which can be removed by screening. Addition of small amounts of either acid or lime produces flocculation of both the protein and pectin, leaving a water-clear decantate. The lime clarified press water has good keeping qualities, if not neutralized. The constituents most objectionable in my proposed return of the press water to the sugar recovery process are the nitrogenous compounds and I prefer the use of lime for their removal.

Into the mixing tank 10, milk of lime is introduced continuously through the conduit 13 from the lime tank 14, at the rate of 0.1% to 0.15% CaO on press water.

The quantity is carefully regulated through suitable feeding mechanism 16, operating in the predetermined proportion to a metering device 17 interposed in the line 9.

The addition of the proper quantity of lime causes a flocculation of pectins and nitrogenous substances which will settle out in the usual type of settler-clarifier used in the sugar industry. From the mixing tank 10, the treated liquid is conveyed through conduit 18 to the settler-clarifier tank 19, the liquid being disturbed as little as possible to avoid breaking up the flocculation.

From the tank 19, the overflow is pumped through conduit 21 to the cooling tower 22 and then through conduit 23 to the storage tank 24, from which the now purified water may be drawn through conduit 26 as needed for the Steffen solution mixer 27. The cooling tower is designed to cool the clarified press water from its production temperature of around 125° F. to a maximum of 70° F.

The settlings in the tank 19 having an average solid content of 2.6% is drawn off through conduit 28 to a filter supply tank 29 and thence through conduit 31 to filters 32. Filtration is best effected on a low pressure filter using gravity flow of low head to conduct the fragile precipitate to the filter.

The filter cake is discharged without washing and then mixed with the pulp from the press 1 for evaporation in the dryer and ultimate recovery of the solids as dried pulp. The filtrate from filters 32 is conveyed through the conduit 33 to mix with the filtrate in the conduit 21.

Reclaimed water from the storage tank 24, may also be conveyed through the conduit 36 and used as wash water on the hot saccharate presses 37, the cold saccharate presses 38 and on the carbonation presses 39.

In a sugar refining plant which presses pulp, but does not use the Steffen process for the recovery of the sugar in molasses, the reclaimed water may be returned to the battery supply. In this case it is necessary to reduce the lime in solution by carbonating, without cooling, the clear water obtained from the clarifier tank 19 and filter 32.

Water from the line 21 is taken through the conduit 41 to the storage tank 42 from which it is drawn through conduit 43 for carbonating in tank 44. The clarified water at high alkalinity keeps well without spoiling, and carbonation should be done immediately before using as battery supply water.

I claim:

1. In the process of producing beet sugar which includes the steps of extracting the sugar from beets by diffusion and recovering sugar from the juices thus obtained by passing the juices through at least one of the elements of sugar recovery system comprising saccharate filters, first carbonation filters and a Steffen mixer; the improvement which consists of reclaiming pulp press water comprising removing small particles of pulp from the press water, adding lime to the press water in the proportion of from 0.1% to 0.15% on press water to precipitate contained colloids and nitrogenous compounds, separating said precipitate from the water to provide clarified water, cooling the clarified water and recycling said cooled clarified water, selectively, through at least one of said sugar recovery system elements.

2. In the process of producing beet sugar which includes the steps of extracting the sugar from beets by diffusion and recovering sugar from the juices thus obtained by passing the juices through at least one of the elements of sugar recovery system comprising saccharate filters, first carbonation filters and a Steffen mixer; the improvement which consists of reclaiming pulp press water comprising screening the press water to remove small particles of pulp therefrom, adding lime to the press water in the proportion of from 0.1% to 0.15% on press water to precipitate contained colloids and nitrogenous compounds, separating said precipitate from the water to provide clarified water, cooling the clarified water and recycling said cooled clarified water, selectively, through at least one of said sugar recovery system elements.

3. In the process of producing beet sugar which includes the steps of extracting the sugar from beets by diffusion and recovering sugar from the juices thus obtained by passing the juices through at least one of the elements of sugar recovery system comprising saccharate filters, first carbonation filters and a Steffen mixer; the improvement which consists of reclaiming pulp press water comprising screening the press water to remove small particles of pulp therefrom, adding lime to the press waters in the proportion of from 0.1% to 0.15% on press water to precipitate contained colloids and nitrogenous compounds, allowing the limed press water to settle and provide an overflow of clarified water and settlings consisting of a suspension of precipitated colloids and nitrogenous compounds in water, drawing off clarified water from said overflow, filtering said settlings to remove said precipitated colloids and nitrogenous compounds and provide a clarified water filtrate, combining said drawn overflow clarified water and said clarified water filtrate, cooling said combined clarified waters, and recycling said cooled combined clarified waters, selectively, through at least one of said sugar recovery system elements.

PAUL W. ALSTON.

References Cited in the file of this patent

UNITED STATES PATENTS

| Number | Name | Date |
|---|---|---|
| 1,583,299 | McGuire | May 4, 1926 |
| 1,849,998 | Melrose | Mar. 15, 1932 |
| 1,876,491 | Foster | Sept. 6, 1932 |
| 2,268,902 | Ryan | Jan. 6, 1942 |
| 2,332,823 | Wintzell | Oct. 26, 1943 |
| 2,509,408 | Alston et al. | May 30, 1950 |
| 2,560,125 | Pearson | July 10, 1951 |

OTHER REFERENCES

Wintzell et al.: Sugar, October 1944 (pgs. 26–29).